(12) United States Patent
Cannon et al.

(10) Patent No.: US 6,233,322 B1
(45) Date of Patent: May 15, 2001

(54) MESSAGE STORAGE SYSTEMS AND METHODS USING FILTERS

(75) Inventors: Joseph M. Cannon, Harleysville; Donald Alfred Fleck, Emmaus; Philip David Mooney, North Wales, all of PA (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/220,586

(22) Filed: Dec. 28, 1998

(51) Int. Cl.[7] .................................................. H04M 11/00
(52) U.S. Cl. ................... 379/93.24; 379/67.1; 379/88.08
(58) Field of Search ............................... 379/93.24, 93.02, 379/88.13, 88.12, 100.08, 88.08, 67.1, 70

(56) References Cited

U.S. PATENT DOCUMENTS 5,987,528 * 11/1999 Taylor et al. ........................ 709/302

FOREIGN PATENT DOCUMENTS

420779A2 * 4/1991 (EP) ............................... H04L/12/54

* cited by examiner

*Primary Examiner*—Curtis Kuntz
*Assistant Examiner*—Melur Ramakrishnaiah

(57) ABSTRACT

Unique, electronic mailboxes may be configured to allow multiple users to use a single mailbox for storing messages and for screening messages using information related to the messages, such as the name and telephone number of the originator of a message. The unique mailboxes may be configured using systems and methods which make use of user-defined filters which may be applied to each mailbox. Each mailbox may be additionally protected by a password for changing the user defined filters and for retrieving messages.

39 Claims, 1 Drawing Sheet

MESSAGE STORAGE SYSTEMS AND METHODS USING FILTERS

BACKGROUND OF THE INVENTION

People who utilize telephone answering devices ("TADs"), electronic mailboxes, message storage systems and the like must sometimes share the same electronic mailbox. Typically, when this occurs each person sharing the same electronic mailbox is allowed to listen to or play back all of the messages to make sure they have received all of the messages addressed to them even though many of the messages are addressed to others and may not be intended for them. This causes each person to spend more time than is necessary listening to messages directed at others and may even lead to greater undesired results if messages intended for one person are made known to others. Even when there are multiple electronic mailboxes available so that each person can be given a separate mailbox, there is no way to limit the type of calls which are directed into a specific person's mailbox. Typically, a caller is asked to enter a set electronic mailbox number or code using, for example, dual-tone, multiple frequency ("DTMF") dialing, i.e., touch-tone dialing to identify the mailbox and little else. If the user of the mailbox wishes to screen out undesired calls from specific callers, phone numbers, at specific times of the day she is unable to do so.

It is desirable, therefore, to realize systems and methods which will eliminate or reduce the disadvantages of present message storage systems.

Accordingly, it is an object of the present invention to provide for message storage systems and the like which comprise configurations of multiple, unique password-protected electronic mailboxes, where user defined "filters" are applied to each electronic mailbox to make sure that each user will only receive messages intended for them.

It is another object of the present invention to provide methods for storing messages which comprise configuring message storage systems and the like with multiple, unique password-protected electronic mailboxes, where user defined "filters" are applied to each electronic mailbox to make sure that each user will only receive messages intended for them.

It is another object of the present invention to provide for message storage systems which comprise a programmed medium which comprises program code for configuring message storage systems and the like with multiple, unique password-protected electronic mailboxes, where user defined "filters" are applied to each electronic mailbox to make sure that each user will only receive messages intended for them.

It is still a further object of the present invention to provide methods for storing messages which comprise using programmed mediums and components further comprising program code for configuring message storage systems and the like with multiple, unique password-protected electronic mailboxes, where user defined "filters" are applied to each electronic mailbox to make sure that each user will only receive messages intended for them.

Other objectives, features and advantages of the present invention will become apparent to those skilled in the art from the following description taken in conjunction with the accompanying drawings.

SUMMARY OF THE INVENTION

In accordance with the present invention message storage systems are provided with multiple, unique password-protected electronic mailboxes, where user defined "filters" are applied to each electronic mailbox to make sure that each user will only receive messages intended for them. Some of these systems comprise: programmed means or a medium which further comprises program means or a program, the program comprising program code means or program code for: selecting a priority message storage location, non-priority message storage locations and default message storage locations from a message storage memory or circuitry; applying filters to the priority message storage location and non-priority message storage locations; comparing the filters of the priority message storage location and nonpriority message storage locations to a message signal; storing the message signal in the priority message storage location when the message signal matches a filter of the priority message storage location; storing the message signal in a non-priority message storage location when the message signal matches a filter of a non-priority message storage location and does not match a filter of the priority message storage location; and storing the message signal in a default message storage location when the message signal does not match a filter of the priority and non-priority message storage locations. Other embodiments may comprise programs which additionally comprise program code for: assigning a password code to each message storage location; applying filters to the priority message storage location when a password signal matches a password code assigned to the priority message storage location; and applying filters to a non-priority message storage location when a password signal matches a password code assigned to the non-priority message storage location.

The present invention envisions embodiments where the message storage systems comprise: selection circuitry for selecting a priority message storage location, non-priority message storage locations and default message storage locations from message storage memory circuitry; application circuitry for applying filters to the priority message storage location and non-priority message storage locations; comparison circuitry for comparing the filters of the priority message storage location and non-priority message storage locations to a message signal; and storage circuitry for storing the message signal in the priority message storage location when the message signal matches a filter of the priority message storage location, for storing the message signal in a non-priority message storage location when the message signal matches a filter of a non-priority message storage location and does not match a filter of the priority message storage location and for storing the message signal in a default message storage location when the message signal does not match a filter of the priority and non-priority message storage locations. An additional embodiment comprises password circuitry for assigning a password code to each message storage location. Still other embodiments comprise application circuitry for applying filters to: the priority message storage location when a password signal matches a password code assigned to the priority message storage location; and to a non-priority message storage location when a password signal matches a password code assigned to the non-priority message storage location.

All of these embodiments may additionally comprise: message storage memory or circuitry for storing priority, non-priority and default message storage locations; configurations where message storage locations comprise electronic mailboxes; configurations where filters may be selected from a group consisting of name, phone number, time, date and ring cadence; and configurations which additionally comprise receiving circuitry or a receiver for receiving message signals and a password signal.

In addition to systems, the present invention envisions methods for storing messages, some of which comprise using programmed means or a medium, the medium comprising a program or program means, the program further comprising program code means or program code for configuring message storage systems and the like with multiple, unique password protected electronic mailboxes, where user defined "filters" are applied to each electronic mailbox to make sure that each user will only receive messages intended for them. Embodiments which utilize programmed mediums may comprise using programmed mediums, the mediums comprising programs, the programs further comprising program code for: selecting a priority message storage location, non-priority message storage locations and default message storage locations from a message storage memory; applying filters to the prority message storage location and non-priority message storage locations; comparing the filters of the priority message storage location and non-priority message storage locations to a message signal; storing the message signal in the priority message storage location when the message signal matches a filter of the priority message storage location; storing the message signal in a non-priority message storage location when the message signal matches a filter of a non-priority message storage location and does not match a filter of the priority message storage location; and storing the message signal in a default message storage location when the message signal does not match a filter of the priority and non-priority message storage locations. Alternative embodiments comprise assigning a password code to each message storage location; applying filters to the priority message storage location when a password signal matches a password code assigned to the priority message storage location; and applying filters to a non-priority message storage location when a password signal matches a password code assigned to the non-priority message storage location.

The present invention also envisions similar methods as just described which do not utilize programmed mediums.

All of the inventive methods may comprise: the application of filters selected from a group consisting of name, phone number, time, date and ring cadence; the reception of message signals and a password signal; and configurations where message storage locations comprise electronic mailboxes.

The present invention and its advantages can be best understood with reference to the drawings, detailed description of the preferred embodiments and claims that follow.

BRIEF DESCRIPTION OF THE DRAWINGS

FIG. 1 may also be referred to with reference to alternative embodiments which may comprise programmed components and additional embodiments directed to methods envisioned by the present invention.

DESCRIPTION OF THE PREFERRED EMBODIMENTS

Figure 1:
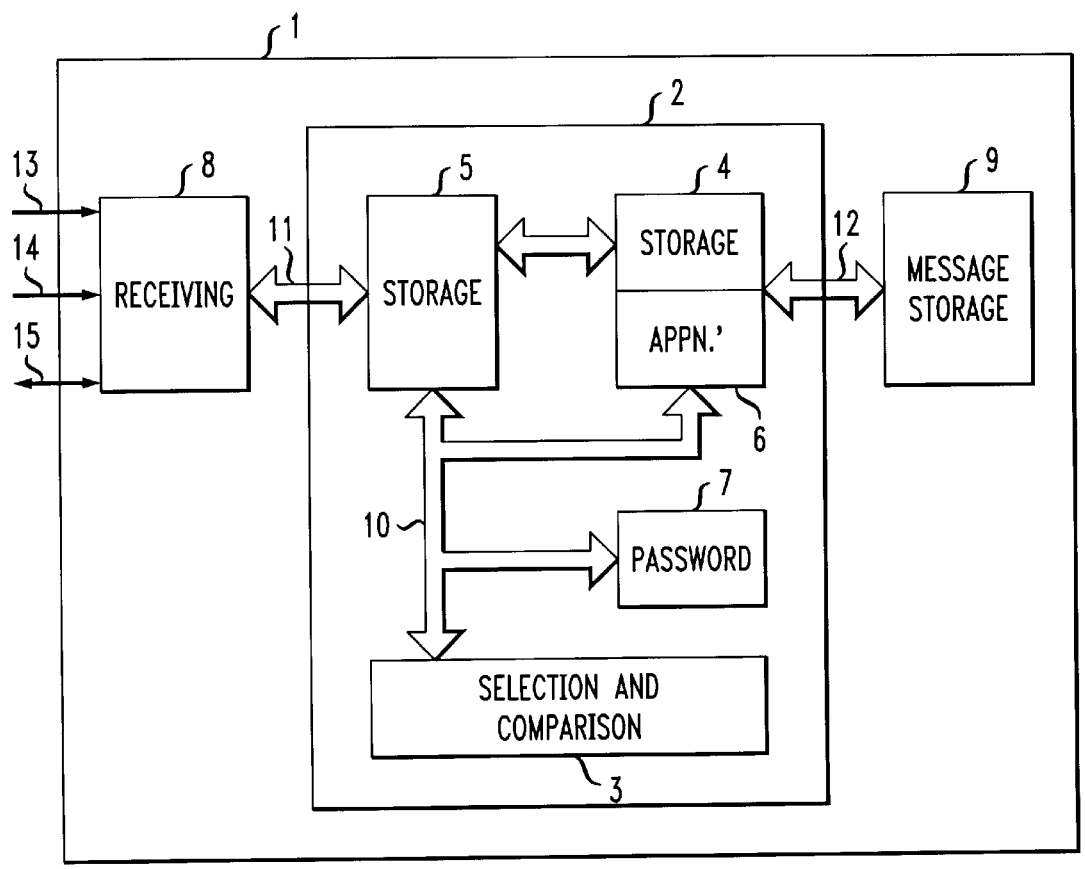
FIG. 1 shows a message storage system according to one embodiment of the present invention.

Referring to FIG. 1 there is shown an embodiment of the inventive message storage system 1. The system 1 comprises: a medium or circuitry 2 which may comprise selection and comparison circuitry 3, application circuitry 6, storage circuitry 4,5 and password circuitry 7; message storage memory or circuitry 9; and receiving circuitry 8. These components are shown as separate components but may be combined into one unit or separated into more units as is known by those skilled in the art. In addition, the receiving circuitry 8 and message storage memory circuitry 9 may also be combined into the medium 2.

One or more of these elements may be programmed.

The medium 2 (and system 1) may comprise at least the following: a combination of hardware only, a combination of hardware and a program, or a single processor combined with a program. The program and code is in a format well known in the art. When combined in one processor, the individual components may be combined into one unit. The exact form of the system is left up to those in the art. In any case, the end result desired is to give a user of the message storage system the ability to configure unique, password protected electronic mailboxes.

To begin with, a priority message storage location may be selected from the memory 9. This priority message storage location represents the electronic mailbox which is of most importance to the user, as will be apparent from the discussion which follows. This location may be selected by selection circuitry 3. The selection circuitry 3 selects not only the priority location, but also selects non-priority and default message storage locations from the memory 9 as well.

Once selected, filters may be applied to each storage location or electronic mailbox. As its name indicates, the highest priority is given to the priority storage location. Application circuitry 6 applies filters to the priority and non-priority message storage locations or electronic mailboxes. By way of illustration only, these filters may comprise a person's name, a phone number, time of day, date and/or ring cadence and may themselves be realized in hardware, firmware, software or the like. It is to be emphasized that the number and type of filters is not limited by the present invention. Depending on the number and type of filters, however, additional circuitry known to those in the art may be needed. When a message signal 13 is received by receiving circuitry 8 it is sent via bus 11 to storage circuitry 5 which may comprise a combination of input, output and memory components. The message signal 13 may comprise DTMF type information, caller identification information or the like such as numeric data representing a caller's telephone number or other information input by the caller via DTMF type dialing. The message signal 13 may also originate from a central office or the like of a communications company, such as a telephone company. In addition, the message signal also comprises a message to be left with a user of the system 1. The exact origination of the message signal is not critical to realizing systems and methods envisioned by the present invention. The message signal 13 may also originate from another device, such as a telephone, when the message signal 13 comprises ring cadence signals and the like. Continuing, the received message signal 13 is compared to filters which have been applied to the priority message storage location using techniques well known in the art. This comparison may be completed by comparison circuitry 3. If the message signal matches a filter applied to the priority message location then the message is only stored in that location using storage circuitry 4. For example, the name filter "Smith" can be applied to the priority message location. If the message signal 13 originated from a person named Smith then the message signal would match the filter and would only be stored in the priority location. Storage circuitry 4 is similar to storage circuitry 5 and the two may be combined into one unit. In a preferred embodiment of the invention there is only one priority message storage location, but multiple ones can be realized following the inventive system and method.

If there is no match the comparison circuitry 3 then compares the message signal to filters which have been applied to each of the one or more non-priority message storage locations. If the message signal matches a filter applied to a non-priority location, it is stored in that location by storage circuitry 4. In the event that the message signal 13 matches a filter of both the priority location and a non-priority location, the signal is only stored in the priority location.

If the signal does not match any of the filters applied to the priority and non-priority locations, it is stored by storage circuitry 4 in default message locations of the memory 9.

For completeness, it should be understood that the application circuitry 6 can add or subtract filters from each of the storage locations. That is to say that the words "application" or "applying" encompass both the addition or subtraction of filters from the storage locations.

In another embodiment of the invention, the filters may be applied or changed only when the system 1 receives a correct password. A password signal 14 is received by the system 1 via receiver 8. A password code for the priority location and each non-priority location is assigned by, and stored in, password circuitry 7. Upon receipt of the password signal, the system 1 compares the password signal to the stored password codes. If a match occurs, the application circuitry 6 may then be used to change the filters already assigned to the priority or non-priority location whose password code matches that of the password signal. This comparison may be carried out by the application circuitry 6, password memory 7, a combination of the two or by other means known to those in the art. The word "assigning" encompasses the initialization of password codes and the changing of password codes as well by password circuitry 7. By so applying the user-defined filters, unique mailboxes can be obtained. The filters help to direct messages to specific user's mailboxes and may also act to restrict the sending of messages to the same mailbox.

Retrieval of the stored messages may be realized using many alternative means. As shown in FIG. 1, retrieval pathway 15 may be used to retrieve the messages. This pathway may originate from a local device, such as when the system 1 is made apart of a telephone, or may originate from a remote system. Other means of retrieving the messages may combine use of the password signal 14 and retrieval pathway 15.

As indicated initially, the inventive system and method envisions embodiments where some or all of the components in FIG. 1 are programmed. For example, the medium 2 may comprise programmed application circuitry 4 which comprises a program or program means, the program further comprising program code or code means for applying filters to the priority storage location and non-priority storage locations. Similarly, each of the components shown comprising the system 1 may be programed. For simplicity, to understand this embodiment the program may be assume to be the same program having different code assigned to each of the circuitry shown in FIG. 1. However, separate programs may also be written for each component of the system 1.

Figure 2:
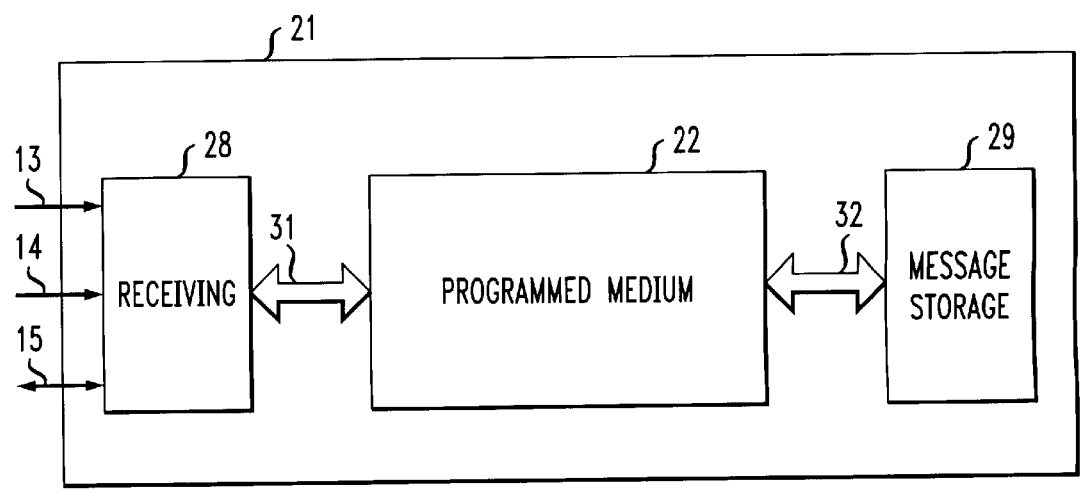
FIG. 2 shows a message storage system according to another embodiment of the present invention. Like FIG. 1, FIG. 2 may also be referred to with reference to alternative embodiments which may comprise programmed components and additional embodiments directed to methods envisioned by the present invention.

Another embodiment of the invention is shown in FIG. 2. This embodiment envisions a system which comprises a medium where all of the individual circuitry shown in FIG. 1 is combined together. The system 21 comprises programed medium or means 22. The medium 22 comprises a program or program means further comprising code or code means in a format known to those in the art.

In this embodiment the medium 22 configures the system 21 to obtain the unique electronic mailboxes realized by the embodiments discussed above. The program code comprises code or code means for: selecting a priority message storage location, non-priority message storage locations and default message storage locations from a message storage memory or circuitry 29; applying filters to the priority message storage location and non-priority message storage locations; comparing the filters of the priority message storage location and non-priority message storage locations to a message signal 13; storing the message signal 13 in the priority message storage location of memory 29 when the message signal 13 matches a filter of the priority message storage location; storing the message signal 13 in a non-priority message storage location of memory 29 when the message signal matches a filter of a non-priority message storage location and does not match a filter of the priority message storage location; and code for storing the message signal 13 in a default message storage location of memory 29 when the message signal 13 does not match a filter of the priority and non-priority message storage locations.

Still another embodiment of the present invention envisions medium 22 whose program additionally comprises code or code means for assigning a password code to each message storage location and additional code for controlling the application of filters to the priority message storage location and non-priority message storage locations. In this way the medium 22 applies or changes the filters applied to the priority location when a password signal 14 matches the password code assigned to the priority message storage location and applies or changes the filters applied to a non-priority message storage location when the password signal 14 matches the password code assigned to the non-priority message storage location.

Other embodiments envisioned by the present invention comprise methods for storing messages to obtain the unique electronic mailboxes described above. One such method comprises using a programmed medium or means, the medium comprising a program or program means, the program further comprising program code or code means for selecting a priority message storage location, non-priority message storage locations and default message storage locations from a message storage memory; applying filters to the priority message storage location and non-priority message storage locations; comparing the filters of the priority message storage location and non-priority message storage locations to a message signal; storing the message signal in the priority message storage location when the message signal matches a filter of the priority message storage location; storing the message signal in a non-priority message storage location when the message signal matches a filter of a non-priority message storage location and does not match a filter of the priority message storage location and storing the message signal in a default message storage location when the message signal does not match a filter of the priority and non-priority message storage locations. Additionally, the method may comprise a medium which comprises program code for assigning a password code to each message storage location, applying filters to the priority message storage location when a password signal matches the password code assigned to the priority message storage location, and may further comprise applying filters to a non-priority message storage location when a password signal matches the password code assigned to the non-priority message storage location.

Each embodiment of the invention may also comprise receiving circuitry or the like, for receiving the message and password signals, message storage memory circuitry or the like, and filters selected from a wide array of choices including: person's name, phone number, time, date and ring cadence.

It is to be understood that changes and variations may be made without departing from the spirit and scope of this invention as defined by the claims that follow.

We claim:

1. A telephony message storage system comprising:
a programmed medium comprising:
program code for selecting a priority message storage location, non-priority message storage locations and default message storage locations from a message storage memory;
program code for applying filters selected from the group consisting of name, phone number, time of day, date and ring cadence to the priority message storage location and non-priority message storage locations;
program code for comparing the filters of the priority message storage location and non-priority message storage locations to a telephony message signal;
program code for storing the message signal in the priority message storage location when the message signal matches a filter of the priority message storage location;
program code for storing the message signal in a non-priority message storage location when the message signal matches a filter of a non-priority message storage location and does not match a filter of the priority message storage location; and
program code for storing the message signal in a default message storage location when the message signal does not match a filter of the priority and non-priority message storage locations.

2. The message storage system as in claim 1 comprising program code for assigning a password code to each message storage location.

3. The message storage system as in claim 1 further comprising a message storage memory, the memory comprising the priority, non-priority and default message storage locations for storing the message signals.

4. The message storage system as in claim 3 wherein the message storage locations comprise electronic mailboxes.

5. The message storage system as in claim 1 wherein the filters are selected from the group consisting of name, phone number, time, date and ring cadence.

6. The message storage system as in claim 1 further comprising a receiver for receiving the message signals and a password signal.

7. The message storage system as in claim 1 wherein the program code for applying filters to the priority message storage location and non-priority message storage locations further comprises program code for applying filters to the priority message storage location when a password signal matches a password code assigned to the priority message storage location.

8. The message storage system as in claim 1 wherein the program code for applying filters to the priority message storage location and non-priority message storage locations further comprises program code for applying filters to a non-priority message storage location when a password signal matches a password code assigned to the non-priority message storage location.

9. The system as in claim 1 wherein the telephony message signal comprises a DTMF signal.

10. The system as in claim 1 wherein the telephony message signal comprises a caller-identification signal.

11. A telephony message storage system comprising:
programmed medium means comprising:
program code means for selecting a priority message storage location, non-priority message storage locations and default message storage locations from message storage memory circuitry;
program code means for applying filters selected from the group consisting of name, phone number, time of day, date and ring cadence to the priority message storage location and non-priority message storage locations;
program code means for comparing the filters of the priority message storage location and non-priority message storage locations to a telephony message signal;
program code means for storing the message signal in the priority message storage location when the message signal matches a filter of the priority message storage location;
program code for storing the message signal in a non-priority message storage location when the message signal matches a filter of a non-priority message storage location and does not match a filter of the priority message storage location; and
program code means for storing the message signal in a default message storage location when the message signal does not match a filter of the priority and non-priority message storage locations.

12. The message storage system as in claim 11 comprising program code means for assigning a password code to each message storage location.

13. The message storage system as in claim 11 further comprising message storage memory means, the memory means comprising the priority, non-priority and default message storage locations for storing the message signals.

14. The message storage system as in claim 13 wherein the message storage locations comprise electronic mailboxes.

15. The message storage system as in claim 11 wherein the filters are selected from the group consisting of name, phone number, time, date and ring cadence.

16. The message storage system as in claim 11 further comprising receiving circuitry for receiving the message signals and a password signal.

17. The message storage system as in claim 11 wherein the program code means for applying filters to the priority message storage location and non-priority message storage locations further comprises program code means for applying filters to the priority message storage location when a password signal matches a password code assigned to the priority message storage location.

18. The message storage system as in claim 11 wherein the program code means for applying filters to the priority message storage location and non-priority message storage locations further comprises program code means for applying filters to a non-priority message storage location when a password signal matches a password code assigned to the non-priority message storage location.

19. The system as in claim 11 wherein the telephony message signal comprises a DTMF signal.

20. The system as in claim 11 wherein the telephony message signal comprises a caller-identification signal.

21. A telephony message storage system comprising:

selection circuitry for selecting a priority message storage location, non-priority message storage locations and default message storage locations from message storage memory circuitry;

application circuitry for applying filters selected from the group consisting of name, phone number, time of day, date and ring cadence to the priority message storage location and non-priority message storage locations; comparison circuitry for comparing the filters of the priority message storage location and non-priority message storage locations to a telephony message signal; and storage circuitry for storing the message signal in the priority message storage location when the message signal matches a filter of the priority message storage location, and for storing the message signal in a nonpriority message storage location when the message signal matches a filter of a non-priority message storage location and does not match a filter of the priority message storage location and for storing the message signal in a default message storage location when the message signal does not match a filter of the priority and non-priority message storage locations.

22. The message storage system as in claim 21 further comprising password circuitry for assigning a password code to each message storage location.

23. The message storage system as in claim 21 further comprising message storage memory circuitry, the memory circuitry comprising the priority, non-priority and default message storage locations for storing the message signals.

24. The message storage system as in claim 23 wherein the message storage locations comprise electronic mailboxes.

25. The message storage system as in claim 21 wherein the filters are selected from the group consisting of name, phone number, time, date and ring cadence.

26. The message storage system as in claim 21 further comprising receiving circuitry for receiving the message signals and a password signal.

27. The message storage system as in claim 21 wherein the application circuitry for applying filters to the priority message storage location and non-priority message storage locations further comprises circuitry for applying filters to the priority message storage location when a password signal matches a password code assigned to the priority message storage location.

28. The message storage system as in claim 21 wherein the application circuitry for applying filters to the priority message storage location and non-priority message storage locations further comprises circuitry for applying filters to a non-priority message storage location when a password signal matches a password code assigned to the non-priority message storage location.

29. The system as in claim 21 wherein the telephony message signal comprises a DTMF signal.

30. The system as in claim 21 wherein the telephony message signal comprises a caller-identification signal.

31. A method for storing telephony messages comprising:

selecting a priority message storage location, non-priority message storage locations and default message storage locations from message storage memory circuitry;

applying filters selected from the group consisting of name, phone number, time of day, date and ring cadence to the priority message storage location and non-priority message storage locations; comparing the filters of the priority message storage location and non-priority message storage locations to a telephony message signal;

storing the message signal in the priority message storage location when the message signal matches a filter of the priority message storage location;

storing the message signal in a non-priority message storage location when the message signal matches a filter of a non-priority message storage location and does not match a filter of the priority message storage location; and storing the message signal in a default message storage location when the message signal does not match a filter of the priority and non-priority message storage locations.

32. The method as in claim 31 further comprising assigning a password code to each message storage location.

33. The method as in claim 31 wherein the filters are selected from the group consisting of name, phone number, time, date and ring cadence.

34. The method as in claim 31 further comprising receiving the message signals and a password signal.

35. The method as in claim 31 wherein applying filters to the priority message storage location and non-priority message storage locations further comprises applying filters to the priority message storage location when a password signal matches a password code assigned to the priority message storage location.

36. The method as in claim 31 wherein applying filters to the priority message storage location and non-priority message storage locations further comprises applying filters to a non-priority message storage location when a password signal matches a password code assigned to the non-priority message storage location.

37. The method as in claim 31 wherein the message storage locations comprise electronic mailboxes.

38. The method as in claim 31 wherein the telephony message signal comprises a DTMF signal.

39. The method as in claim 31 wherein the telephony message signal comprises a caller-identification signal.

* * * * *